Patented Sept. 6, 1949

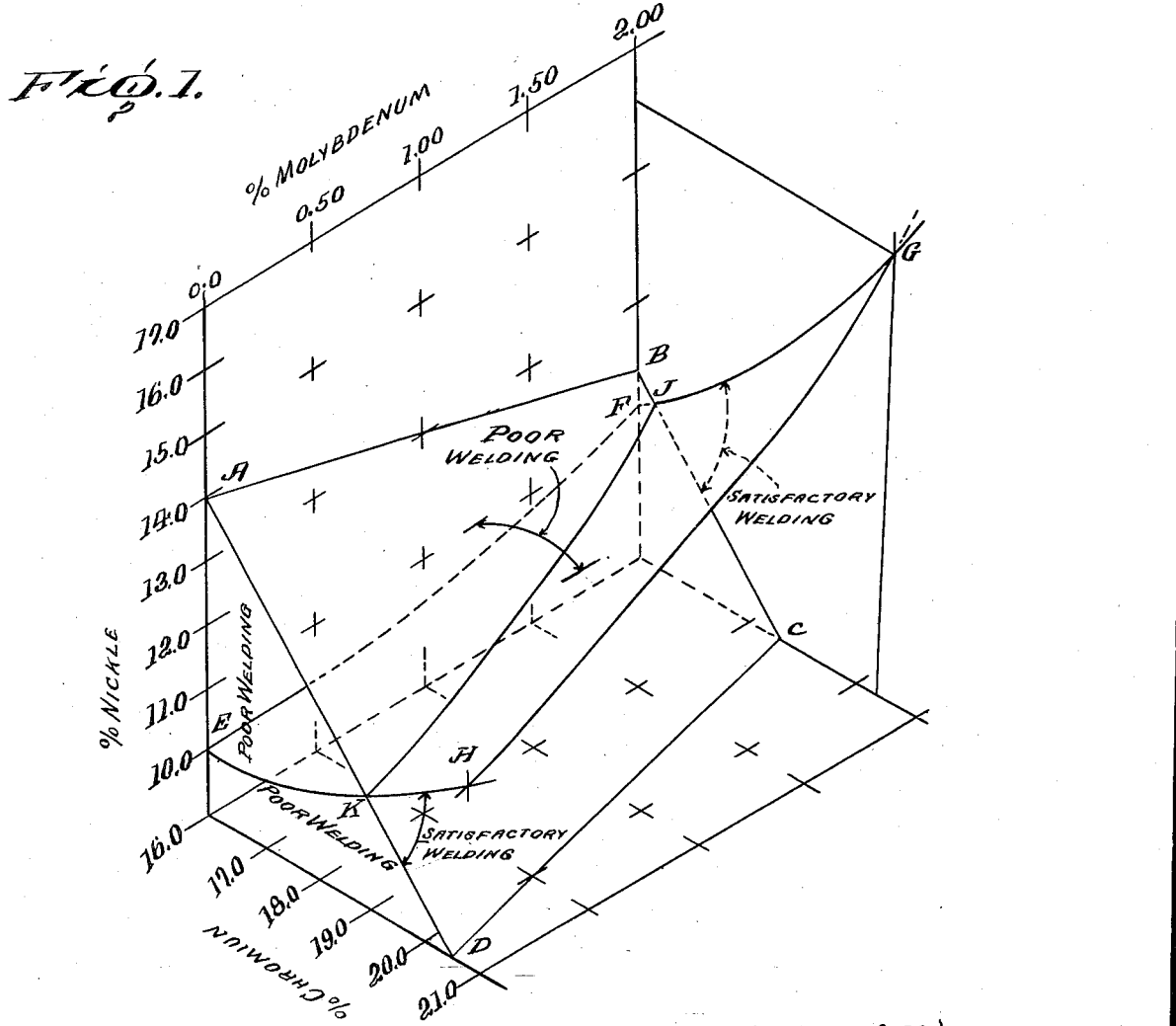

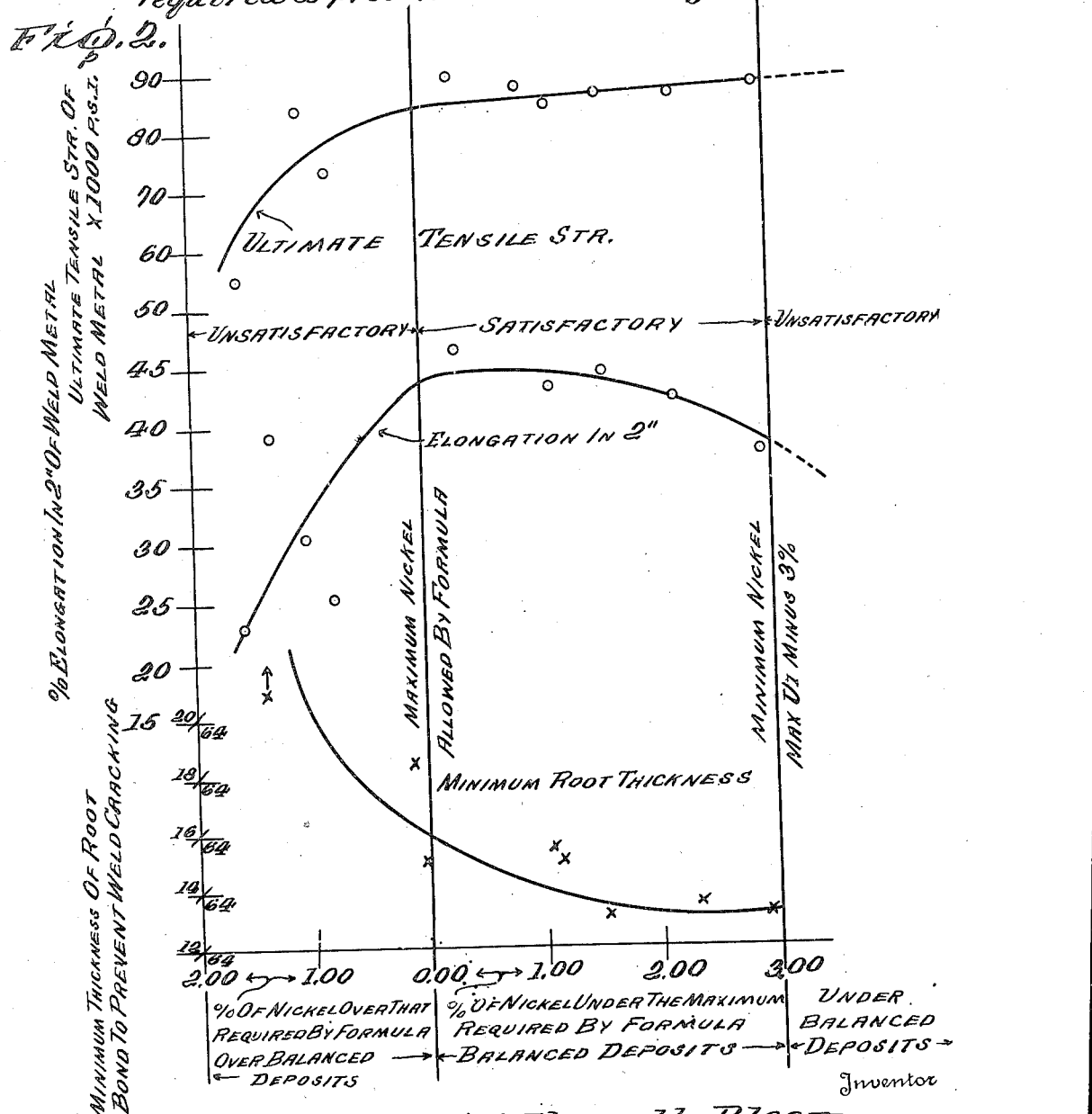

2,481,385

UNITED STATES PATENT OFFICE 2,481,385

WELD AND WELD ROD

Fredrick Kenneth Bloom, Baltimore, Md., assignor, by mesne assignments, to Armco Steel Corporation, a corporation of Ohio Application March 31, 1944, Serial No. 528,968

7 Claims. (Cl. 75—128)

My invention relates to welding, more particularly to deposit-welding and to the resultant weld and welded products.

An object of my invention is the provision of a method of producing fusible manufactures having balanced constituents for deposit-welding.

Another object of my invention is the provision of deposit-welding electrodes which are suited for producing crack-resistant high alloy steel welds in high or low alloy parent steel.

A further object of my invention is the provision of a method of welding steel of high or low alloy content which gives reliable control over the physical and metallurgical properties of the weld obtained.

Other objects of my invention in part will be obvious and in part pointed out hereinafter.

The invention accordingly consists in the combination and proportioning of elements, composition of materials, and arrangement of parts, the scope of the application of which is indicated in the following claims.

In the accompanying drawing the Figure 1 illustrates certain features of my invention, and Figure 2 illustrates, by means of charts, certain important results achieved through the practice of my invention.

As conducive to a clearer understanding of certain features of my invention, it may be noted at this point that numerous welding compositions of the chromium-nickel varieties heretofore employed in the fusion deposition welding of steels are when fused substantially of purely austenitic character, and as such are known on occasions to give welds which tend to crack, or which are lacking in strength or ductility.

A somewhat modified group of austenitic fusion welding compositions, namely chromium-manganese and chromium-manganese-nickel varieties, different from the substantially pure austenitic grades in that appreciable quantities of martensite are included in the fused composition structure, also are open on occasions to the same objections as are the relatively pure austenitic materials.

When an austenitic-martensitic welding composition is deposited, the deposit is likely to be hard, brittle and magnetic indicating that the weld is no longer predominantly austenitic. There is also a frequent tendency for welds made from austenitic or austenitic-martensitic metal to crack as by hot cracking in the root passes at the time the composition is being deposited, which of course seriously lowers the actual strength and ductility of the weld.

It may also be noted that the heretofore known welding compositions differ markedly in ability to withstand corrosive attack, and thus it would be futile to employ certain of the compositions for providing stainless welded joints in low alloy steels or in high alloy steels including those of stainless quality.

In other instances certain austenitic welding compositions of the prior art are unsuitable for fusion-welding hardenable steels either of low alloy content such as armor plate or high alloy quality as for example hardenable stainless steel. The hardenable steels are very difficult to weld by fusion deposition methods, one reason being that the conditions of welding set up stresses which embrittle, weaken and frequently crack the weld.

An outstanding object of my invention accordingly is the provision of chromium-nickel-manganese stainless steel welding or fusible filler rods or electrodes which give strong, ductile alloy steel welds characterized by a lacking tendency to crack either while being formed or after depositing, and which are useful in producing welds in a wide variety of alloy steels including those of the highly hardenable grades.

Referring now more particularly to the practice of my invention, I provide strong, ductile, crack-resistant welds of austenitic-delta-ferritic structure in high alloy or low alloy steels such as in armor plate or hardenable stainless steels by thermally fusing to the parent metal stainless chromium-nickel-manganese steel from a welding manufacture such as from a rod or electrode, in sufficient quantity to effect welding. The rod or electrode employed is of such composition as to yield a deposit of weld alloy, comprising 16% to 22% chromium, 8.5% to 18.5% nickel, from fractional percentages up to approximately 4% manganese, not more than 0.15% carbon, with or without molybdenum ranging from fractional percentages up to about 2.0%, the total alloy content being at least 32%, and the remainder substantially all iron except for small amounts of incidental impurities. Because of losses in the welding operation and other variables, the composition of the weld rod or manufacture is given in terms of the resultant weld deposit. A number of additional important features of my welding composition will be noted hereinafter.

To ensure the formation of strong, ductile welds having a structure which contains a beneficial amount of delta ferrite in an austenitic matrix, and to avoid a deposit which is wholly austenitic and subject to hot cracking, the chromium, nickel, manganese, molybdenum when used, and carbon contents of the metal deposited by the welding rod or electrode, I find must bear a ratio or relationship one to the other within the broad percentage ranges of ingredients already specified. An approximate relationship of ingredients, this being an important feature of my invention, is defined by the following formula:

$$\text{Maximum \% Ni} = \frac{(\% Cr + 2(\% Mo) - 16)^2}{12} - \frac{\% Mn}{2} + 30(0.10 - \% C) + 11$$

The relationship given above is generally illustrated in Figure 1 of the accompanying drawing. It will be noted that any of the various broad percentages of ingredients stated hereinbefore may be substituted in the formula as called for, to arrive at the approximate proportion of ingredients in the deposit welds produced from the welding rods, or welding electrodes which I provide. Where no molybdenum is to be employed in the rod or electrode no molybdenum appears in the weld deposit and a zero percentage is substituted in the formula for the molybdenum term.

In the provision of welding rods or electrodes having a relationship between components thereof which yields a deposit substantially consistent with the terms of the formula as prescribed, it is also essential that the percentages of chromium, nickel, molybdenum when used, and manganese in the metal deposited by the rod or electrode total in sum at least about 32%. I find that the deposit material, in which this approximate minimum total is maintained, gives welds which are relatively soft and ductile without tending to be brittle, particularly when the weld is formed under conditions where considerable dilution of the added metal by the parent metal occurs as in the welding of hardenable metal plates ranging up to a maximum of about 1½ inch in thickness. For greater thicknesses of plate as from 1½ inches to 6 or more inches, I find advantage in employing a percentage total somewhat greater than approximately 32% to compensate for increased dilution.

In way of illustration, the hardnesses of weld beads deposited by $\frac{7}{16}$ inch welding electrodes are compared in Table I below with the total chromium, nickel, manganese, molybdenum content of their substantially undiluted deposit analyses. In connection with comparisons drawn it will be understood that weld beads which exceed in hardness about Rockwell C25 become brittle and magnetic indicating that they are no longer austenitic and are, therefore, undesirable.

*Table I.—Weld compositions and hardnesses*

| Grade No. | Undiluted Deposit Analyses | | | | Total Mn, Cr, Ni, Mo | Average Hardness of Bead when Laid on Hardenable Steel Bars |
|---|---|---|---|---|---|---|
| | Mn | Cr | Ni | Mo | | |
| 1 | 1.54 | 19.67 | 10.17 | .07 | 31.4 | Rockwell C39. |
| 2 | 1.90 | 19.75 | 9.97 | .07 | 31.7 | Rockwell C26. |
| 3 | 1.81 | 19.06 | 9.70 | 1.44 | 32.0 | Rockwell C21. |
| 4 | 1.98 | 19.96 | 10.08 | 1.59 | 33.6 | Rockwell C23. |
| 5 | 4.47 | 19.79 | 10.02 | .08 | 34.4 | Rockwell B93. |
| 6 | 4.56 | 19.79 | 10.12 | 2.88 | 37.3 | Rockwell B94. |

As illustrative of the practice of my invention, I provide a chromium-nickel-manganese welding electrode having a wire or bar core and a coating, in which electrode or manufacture the total welding metal ingredients are present in such amounts to yield a deposit of any one of the following approximate proportions, or in any other proportions approximately consistent with the formula noted hereinbefore, and the remainder substantially all iron except for small amounts of incidental impurities as indicated, for example, in Table II.

*Table II.—Weld compositions*

(a) 17% Cr; 2% Mn; 2% Mo; 0.1% C; and 12.08% Ni (max.) 33.1% total alloy.
(b) 18% Cr; 2% Mn; 1% Mo; 0.1% C; and 11.33% Ni (max.) 32.3% total alloy.
(c) 19% Cr; 2% Mn; 50% Mo; 0.1% C; and 11.33% Ni (max.) 32.8% total alloy.
(d) 20% Cr; 2% Mn; 0.1% C; and 11.33% Ni (max.) 33.3% total alloy.
(e) 21% Cr; 2% Mn; 2% Mo; 0.1% C; and 16.75% Ni (max.) 41.75% total alloy.
(f) 22% Cr; 2% Mn; 1.5% Mo; 0.1% C; and 16.75% Ni (max.) 42.25% total alloy.

The electrode welding metal ingredients are present in the metallic core and in the coating, the nickel and iron preferably being alloyed in the core together with most or all of the chromium for simplicity and economy of production. Any molybdenum included in the electrode preferably forms a part of the coating rather than a part of the core material, because fabrication of the core as by drawing otherwise is made difficult. I find it cheaper to provide most of the manganese as an alloy element in the core, however, leaving a minor part in the coating particularly where fairly high manganese content, say about 4% is desired in the weld.

I maintain the sum total percentage of chromium, manganese, molybdenum when used, and nickel such as to give in the weld something above the minimum value of approximately 32% as will be noted in way of illustration from the several examples (a) through (f) just mentioned. In use, the electrode which incidentally may include a suitable flux material such as a flux binder in the coating, is fused as by means of suitable arc welding apparatus onto parent metal members to be welded and, as deposited, provides in alloy the various welding metal ingredients thereof to form a weld which is strong, ductile, and crack-resistant. Welds of exceptionally high quality are obtained in high alloy or low alloy hardenable steel through the use of my electrodes.

It will be understood that the formula which I employ is empirical, and that any specific proportion of ingredients established in terms of the formula may be varied somewhat and still remain within the scope of my invention. In way of illustration, the minimum amount of nickel permissible may be approximately 3% less than the maximum percentage as determined with the formula. On the contrary, if the amount of nickel exceeds by much the maximum amount, the weld deposit is likely to be low in ductility and strength.

If the nickel content is too low in proportion to the other elements included in the weld deposit, too much delta ferrite appears and the weld shows a decrease in ductility, although in this case no loss in strength has been noted. Figure 2 exhibits the effects of balanced and unbalanced composition on the tensile strength and elongation of weld.

It is well known in the prior art that weld beads in root passes have a marked tendency to crack down the center upon being deposited, particularly if the joint being welded is restrained. The cracking has heretofore been overcome to some extent by increasing the thickness of the deposited bead. It is not practical, however, to increase this thickness beyond about ¼ inch. A far more desirable and satisfactory procedure is to provide weld deposit materials which are less sensitive to this defect as in accordance with the provisions of my invention. From Figure 1 of the accompanying drawing it will be seen that weld compositions within the formula range are deposited without root cracking in bead thicknesses even considerably less than ¼ inch.

In addition to the data charted in Figure 2, there are listed below in Tables III and IV the tensile strengths and elongation values of samples cut transversely from welds in hardenable steel plates. The actual values of nickel (1) in the samples are compared in each instance with the maximum quantities of nickel (2) required by the formula. Although all of the welds sampled show a sum total of chromium, nickel, manganese, and molybdenum greater than 32%, it will be noted that welds (a) and (b), especially (2), have a somewhat high nickel content as compared with terms of the formula and, therefore, have lower tensile strength and less strength in elongation than any of the welds (c), (d) and (e).

*Table III.—Weld Deposit*

| Composition | | | | | Max Ni (2) Allowed By formula | Diff. between Ni (1) and Ni (2) |
|---|---|---|---|---|---|---|
| C | Mn | Cr | Mo | Ni (1) | | |
| (a)... 0.106 | 4.50 | 18.97 | 0.19 | 10.98 | 9.62 | +1.36 |
| (b)... 0.084 | 4.23 | 19.34 | 0.12 | 10.66 | 10.32 | +0.34 |
| (c)... 0.092 | 4.45 | 18.43 | 1.68 | 10.68 | 11.82 | −1.14 |
| (d)... 0.085 | 3.93 | 19.22 | 0.89 | 10.41 | 11.57 | −1.16 |
| (e)... 0.084 | 4.08 | 18.97 | 1.58 | 10.19 | 12.57 | −2.38 |

*Table IV.—Physical Properties of Welds of Table III*

| | Ult. Tens. Str. | Elongation 2″ | Elongation Across Weld Metal |
|---|---|---|---|
| | P. s. i. | Per cent | Per cent |
| (a) | 72,125 | 6.9 | 19.0 |
| (b) | 91,600 | 8.8 | 24.2 |
| (c) | 95,925 | 11.3 | 27.0 |
| (d) | 96,950 | 12.1 | 27.8 |
| (e) | 98,550 | 11.1 | 26.2 |

Thus it will be seen that in my invention there are provided a balanced deposit weld and methods of producing the same as well as the fusible welding rod or electrode employed in producing the same in which the various objects noted herein together with many thoroughly practical advantages are successfully achieved. It will be noted that the manufactures, for example rods or electrodes, are of such metallic contents as to give stable austenitic-delta-ferritic stainless alloy steel weld deposits which in finished welds are strong and ductile and have no substantial tendency to crack or become excessively hard. It will also be noted that small beads of alloy metal deposited from my welding metal do not tend to crack in the course of forming a weld.

As many possible embodiments of my invention may be made and as many changes may be made in the embodiments hereinbefore set forth, it will be understood that the matter described herein is to be interpreted as illustrative and not as a limitation.

I claim:

1. An electrode for deposit welding of such composition as to yield an austenitic-delta ferritic deposit comprising, in combination, 16% to 22% chromium, 8.5% to 18.5% nickel, from fractional percentages up to 4% manganese, and not more than 0.15% carbon, in proportions substantially consistent with:

$$\text{Maximum } \% \text{ Ni} = \frac{(\% \text{Cr} - 16)^2}{12} - \frac{\% \text{Mn}}{2} + 30(0.10 - \% \text{C}) + 11$$

the chromium, nickel, manganese totalling at least about 32% but under 43%, and the remainder substantially all iron.

2. An electrode of such composition as to yield an austenitic-delta ferritic weld deposit comprising, in combination, 16% to 22% chromium, from fractional percentages up to 4% manganese, 8.5% to 18.5% nickel, from fractional percentages up to 2.0% molybdenum, and not more than 0.15% carbon, in proportions substantially consistent with:

$$\text{Maximum } \% \text{ Ni} = \frac{(\% \text{Cr} - 2(\% \text{Mo}) - 16)^2}{12} - \frac{\% \text{Mn}}{2} + 30(0.10 - \% \text{C}) + 11$$

the chromium, manganese, nickel and molybdenum totalling at least about 32% but less than 43%, and the remainder substantially all iron.

3. A weld electrode for deposit welding having a metallic core and a coating therefor, said electrode comprising, in combination, chromium, nickel, molybdenum, manganese and carbon with the remainder substantially all iron, in proportions to yield an austenitic-delta ferritic weld deposit containing at least 16% chromium, at least 8.5% nickel, together with appreciable quantities of molybdenum and manganese, the total alloy content being at least 32% and being substantially consistent with:

$$\text{Maximum } \% \text{ Ni} = \frac{(\% \text{Cr} + 2(\% \text{Mo}) - 16)^2}{12} - \frac{\% \text{Mn}}{2} + 30(0.10 - \% \text{C}) + 11$$

the nickel and iron constituents together with a substantial portion of the chromium being alloyed in said core, and with a substantial portion of the molybdenum being in said coating.

4. An electrode for deposit welding having a metallic core and a coating therefor, said electrode being of such composition as to yield an austenitic-delta ferritic deposit comprising, in combination, 16% to 22% chromium, from fractional percentages up to 4% manganese, 8.5% to 18.5% nickel, from fractional percentages up to 2.0% molybdenum, and not more than 0.15% carbon, in proportions substantially consistent with:

$$\text{Maximum } \% \text{ Ni} = \frac{(\% \text{Cr} - 2(\% \text{Mo}) - 16)^2}{12} - \frac{\% \text{Mn}}{2} + 30(0.10 - \% \text{C}) + 11$$

the chromium, manganese, nickel and molybdenum totalling at least about 32% but less than 43%, and the remainder substantially all iron, the nickel and iron constituents together with a substantial portion of the chromium, and manganese being alloyed in said core, and with a substantial portion of the molybdenum being in said coating.

5. A crack-resistant weld of austenitic-delta ferritic structure for hardenable steel, said weld comprising 16% to 22% chromium, 8.5% to 18.5% nickel, from fractional percentages up to 4% manganese, up to 2.0% molybdenum, and not more than 0.15% carbon in proportions substantially consistent with:

$$\text{Maximum \% Ni} = \frac{(\% \text{Cr} + 2(\% \text{Mo}) - 16)^2}{12} - \frac{\% \text{Mn}}{2} + 30(0.10 - \% \text{C}) + 11$$

the chromium, nickel, manganese and molybdenum totalling at least 32% but under 43%, and the remainder substantially all iron.

6. A crack-resistant weld of austenitic-delta ferritic structure comprising 16% to 22% chromium, 8.5% to 18.5% nickel, appreciable molybdenum and manganese together with carbon in proportions substantially consistent with:

$$\text{Maximum \% Ni} = \frac{(\% \text{Cr} + 2(\% \text{Mo}) - 16)^2}{12} - \frac{\% \text{Mn}}{2} + 30(0.10 - \% \text{C}) + 11$$

and minimum % nickel about 3 less than said maximum value, and the remainder principally iron exceeding 57% but not exceeding 68%.

7. A crack-resistant weld of austenitic-delta ferritic structure, said weld essentially including 16% to 22% chromium, 8.5% to 18.5% nickel, fractional percentages up to 4% manganese, and not more than 0.15% carbon in relationship substantially consistent with:

$$\% \text{Ni} = \frac{(\% \text{Cr} - 16)^2}{12} - \frac{\% \text{Mn}}{2} + 30(0.10 - \% \text{C}) + 11$$

and a remainder principally iron exceeding 57% but not exceeding 68%.

FREDRICK KENNETH BLOOM.

REFERENCES CITED

The following references are of record in the file of this patent:

UNITED STATES PATENTS

| Number | Name | Date |
|---|---|---|
| 1,762,483 | Norwood | June 10, 1930 |
| 1,893,160 | Clarke | Jan. 3, 1933 |
| 2,083,524 | Payson | June 8, 1937 |
| 2,156,298 | Leitner | May 2, 1939 |
| 2,159,724 | Franks | May 23, 1939 |
| 2,256,614 | Franks | Sept. 23, 1941 |
| 2,329,986 | Goodford | Sept. 21, 1943 |

FOREIGN PATENTS

| Number | Country | Date |
|---|---|---|
| 117,804 | Australia | Nov. 22, 1943 |

OTHER REFERENCES

Molybdenum, Cerium, and Related Steels, pages 28 to 30. By Gillet and Mack. Published 1925 by the Chemical Catalog Co., N. Y.

Alloys of Iron and Chromium, vol. II, Low Chromium, page 414. Published in 1940 by the McGraw-Hill Book Co., N. Y.